Dec. 5, 1939.    B. W. LEFFERDINK ET AL    2,182,592
STRAW HOOD LIFTER AND BELT RELEASER
Filed Dec. 9, 1937    2 Sheets-Sheet 1

Inventors
B. W. Lefferdink
G. G. Lefferdink

By Emil F Lange
Attorney

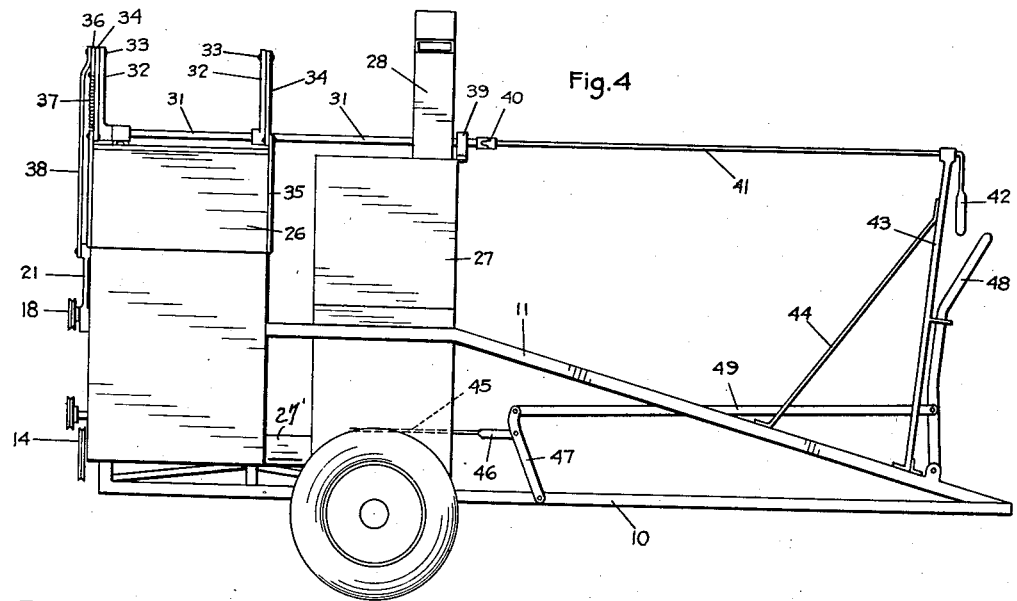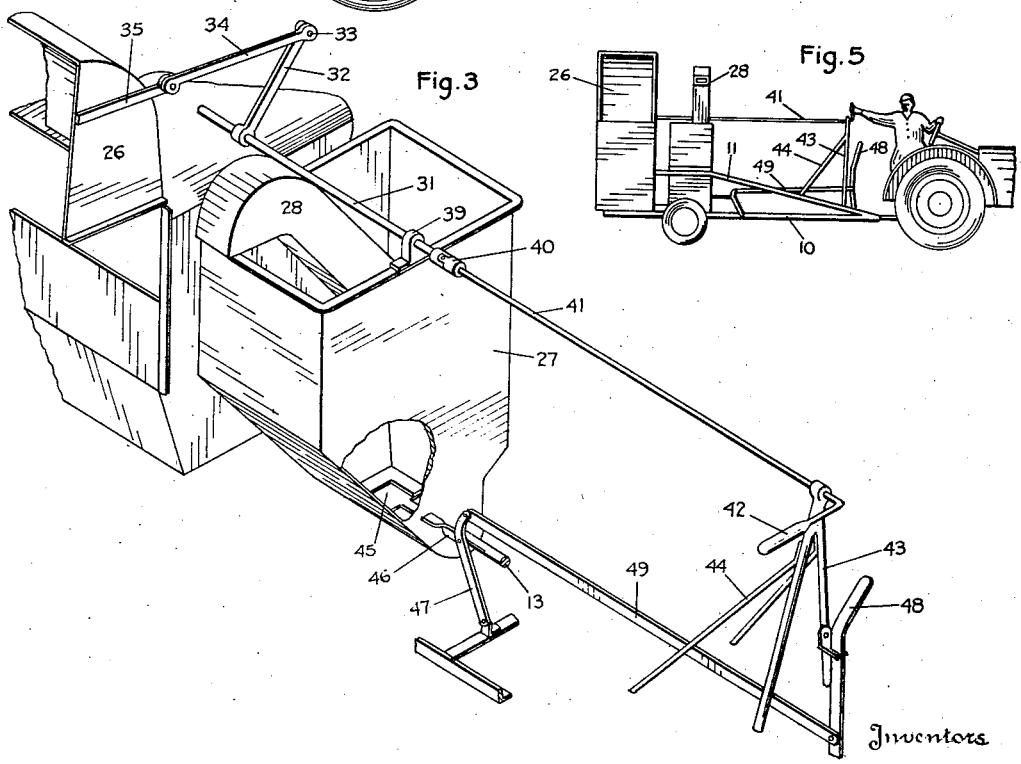

Patented Dec. 5, 1939

2,182,592

UNITED STATES PATENT OFFICE 2,182,592

STRAW HOOD LIFTER AND BELT RELEASER

Berend W. Lefferdink and Glenn G. Lefferdink, Firth, Nebr.

Application December 9, 1937, Serial No. 178,920

5 Claims. (Cl. 130—27)

Our invention relates to attachments for a combine harvester of the kind having a pivoted straw hood and having belt driven mechanism in which the tension on the belt may be released to stop the mechanism with the exception of the driving shaft.

An object of our invention is the provision of a single control for simultaneously lifting the straw hood into its inoperative position and releasing the tension on the belt or for simultaneously restoring to operative position both the straw hood and the drive belt.

Another object which we have in view is the provision of a single control within convenient reach of the driver of the tractor for simultaneously moving the straw hood and the drive belt to either operative or inoperative position.

Another object is the provision of a control within convenient reach of the driver of the tractor for opening or closing the slide in the floor of the grain bin of the combine.

Having in view these objects and others which will be pointed out in the following description, we shall now refer to the drawings, in which Figure 1 is a view in rear elevation of the combine with our attachment secured thereto with all of the parts in their operative position.

Figure 3 is a fragmentary view in perspective and showing parts of the straw hood and of the grain bin in their relation to our attachment.

Figure 4 is a view in side elevation showing the same combine with our attachment.

Figure 5 is a view in side elevation of portions of the tractor and combine and showing particularly the position of the controls with reference to the position of the driver of the tractor, the view being drawn on much reduced scale.

Figure 1:
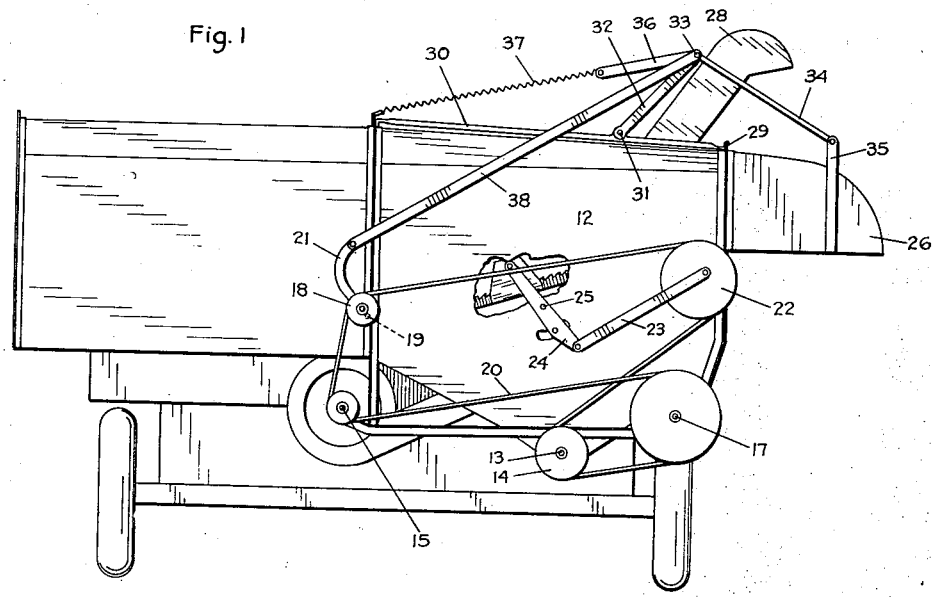
Figure 2:
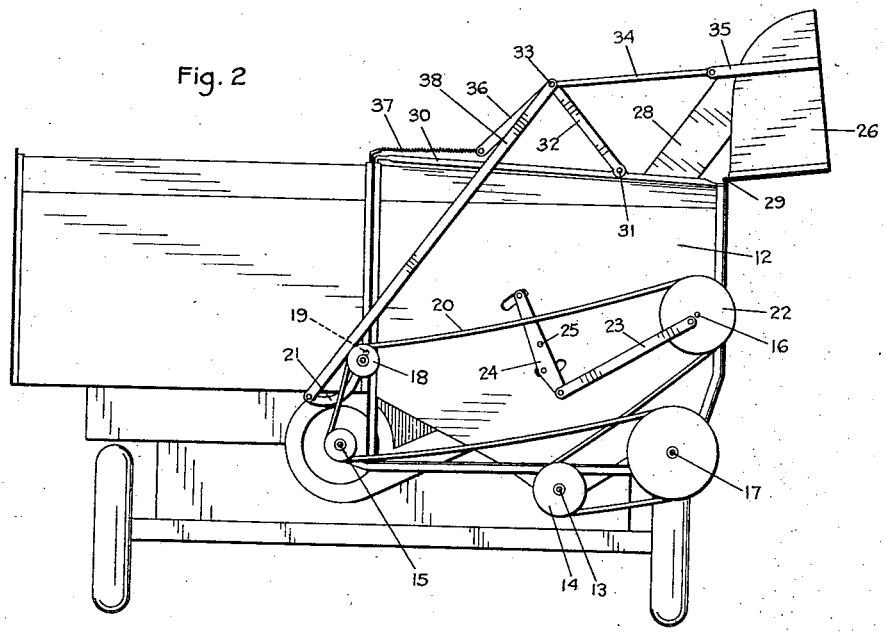
Figure 2 is a view similar to Figure 1 but showing the parts in their inoperative position.

The combine has a wheel supported frame including floor beams 10 and a brace 11. The cutting mechanism as well as the thrashing mechanism does not enter into the present invention and its illustration is therefore deemed unnecessary. Much of the separating mechanism is enclosed, with the driving parts of the separating mechanism positioned outside the enclosed space. The rear wall 12 of the enclosure does enter into the operation of the invention. The shaft 13 projects through the rear wall 12 of the enclosure and it carries a pulley 14. The shaft 13 is connected directly through a knuckle joint with the power take-off shaft of the tractor which pulls the combine. Projecting through the rear wall 12 are also several other shafts including the shaft 15 for driving the fan, the shaft 16 for driving the straw racks, and the shaft 17 for driving the return auger as well as the idler 18 which is rotatably secured to a level 21. A single belt 20 passes over the pulleys of all of these shafts to drive all of the shafts from the shaft 13 while the belt 20 is under tension. The lever 21, which carries the pulley 18, is pivotally secured at point 19 indicated in dotted lines in the drawings, which point is slightly displaced from the center of the pulley, whereby the pulley may be moved either into operative position of the belt as shown in Figure 1 or into inoperative position of the belt as shown in Figure 2. When the parts are in the Figure 2 position all of the shafts will remain stationary with the exception of the shaft 13 which is driven by the tractor shaft. The shaft 13 carries the auger for conveying the separated grain. The pulley 22 of the shaft 16 has a pitman 23 eccentrically secured thereto for actuating the straw rack rocker 24 which is pivotally secured to the pitman 23 at its outer extremity. The straw rack rocker 24 is pivotally secured at 25 to the wall 12. The wall 12 is provided with a pair of arcuate slots for receiving the two pins projecting from the rocker 24 for guiding the movements of the rocker. The upper pin of the straw rack rocker is connected with the straw racks to reciprocate the racks for the separation of the grain from the straw.

After the straw and the grain have been separated, the straw and chaff are blown out by the blower on shaft 15 and through the straw hood 26. In its normal operative position as shown in Figure 1, the straw hood 26 directs the straw downwardly where it is deposited on the surface of the soil in windows. The grain after separation from the straw is carried through passage 27' into the grain bin 27 which is designed to be unloaded periodically into a wagon or a truck. The wagon or truck must be drawn up beside the combine and underneath the mouth of the chute 28 while the combine is stationary. The straw hood 26 is however in the way of the wagon or truck and for avoiding injury to the straw hood, the straw hood is pivotally secured to the frame at 29 so that it may be thrown into its operative position as shown in Figure 1 or into its inoperative position as shown in Figure 2. While removing the grain from the grain bin into a truck the separating mechanism as well as the straw discharging mechanism is idle so that the inoperative position of the straw hood 26 will not discharge any straw at such times.

As thus far described, the combine is wellknown and we make no claim on this combine. Its chief drawback is the inconvenience connected with the operation of moving the parts from their operative to their inoperative position or from their inoperative to their operative position. The driver of the tractor stops the movement of the tractor but permits the operation of the motor for the purpose of driving the shaft 13. He must get off his seat on the tractor and walk around to the rear end of the combine for the purpose of lifting or lowering the straw hood 26 by hand and of manipulating the lever 21 for the purpose of tensioning or releasing the belt 20. This of course necessitates a delay in the movement into position of the wagon or truck and it delays the operator of the tractor every time that a wagon or truck is to be loaded. The delays are particularly serious because they occur at a time when every minute counts in the harvest field. We have therefore provided a mechanism whereby this delay is entirely avoided.

This mechanism includes means for coordinating the movements of the straw hood and the belt release. The connections between the straw hood and the belt release are best shown in Figures 1 and 2. Secured to the top of the frame is a strap 30 serving as a brace for the frame and as a support for the mechanism. The shaft 31 is journalled in the strap 30 and the levers 32 are rigidly secured to the shaft 31. At the upper extremity of the lever 32 is a pin 33 which has also secured thereto a link 34. The link 34 is pivotally connected with a reinforcing strap 35 on the straw hood 26. Also secured to the pin 33 is a link 36 which is connected through a counterbalancing spring 37 with the frame of the combine. It will be apparent that the turning of the shaft 31 will rock the lever 32 to either raise or lower the straw hood 26, the spring 37 assisting in the raising movement. Another link 38 is secured at one of its ends to the pin 33 and at the other end to the end of the lever 21. The rocking of the lever 32 will then not only raise or lower the straw hood 26 but it will also tension or release the belt 20.

Referring now to Figures 3 and 4, it will be seen that the shaft 31 has a second bearing in the bracket 39 and that it is connected through a knuckle joint 40 with a shaft 41 having a downturned hand lever 42. The shaft 41 is journalled in the upper end portion of a supporting frame 43 of inverted V form which is rigidly braced at 44, the frame 43 with the braces 44 having their footings in the brace 11. The handle 42 is within convenient reach of the operator of the tractor who may manipulate that lever without leaving his position on the tractor.

The grain bin 27 is provided with a slide closure 45 which must also be manipulated at a distance from the driver's position on the tractor. In order to complete the simplification of the combine, we provide means having a control within convenient access of the driver of the tractor. The slide 45 has a stem 46 to which we secure a lever 47. A hand lever 48 is positioned immediately below the lever 42 and it is connected through a link 49 with the lever 47. The movement of the lever 47 will cause the opening or closing of the slide 45.

Figure 5 shows in outline and in diagrammatic form the convenient positions of the two levers 42 and 48. The operator may manipulate either or both of these levers without leaving his position on the tractor and even without removing his hands or feet from the controls of the tractor.

Having thus described our invention in such full, clear, and exact terms that its construction and operation will be readily understood by others skilled in the art to which it pertains, what we claim as new and desire to secure by Letters Patent of the United States is:

1. An attachment for combines having a straw hood pivotally secured thereto and pulley equipped shafts for driving the separating mechanism of the combine and a single belt operatively connected with the shaft pulleys, mechanism for varying the tension of the belt to cause the same to assume either an operative or an inoperative position, said attachment including a lever on the frame of the combine, a link connecting said lever to the straw hood, and a second link connecting said lever to said belt tension varying mechanism whereby the movement of said lever in one direction or the other will simultaneously adjust both the straw hood and the belt of the combine into either operative or inoperative position.

2. An attachment for combines having a straw hood pivotally secured thereto and a pulley equipped drive shaft and a plurality of pulley equipped shafts for driving the separating mechanism of the combine and a single belt operative on all of the shaft pulleys and a belt releasing and engaging device, said attachment including a lever fulcrumed on the frame of the combine, a link connecting said lever to the straw hood of the combine, and a second link connecting said lever to the belt releasing and engaging device whereby the movement of said lever in one direction or the other will simultaneously adjust both the straw hood and the belt of the combine into either operative or inoperative position.

3. An attachment for combines having a straw hood pivotally secured thereto and pulley equipped shafting and a belt, for driving the separating mechanism of the combine and mechanism for tensioning or releasing said belt with respect to the pulleys whereby both the straw hood and the belt have an operative and an inoperative position, said attachment including a rock shaft journalled on said combine and terminating at one of its extremities in a handle positioned in close proximity to the operator's position, a lever rigidly secured to said rock shaft, a link connecting said lever to the straw hood, and a second link connecting said lever to the belt tensioning or releasing mechanism of the combine whereby actuation of said rock shaft will simultaneously actuate both the straw hood and the belt tensioning or releasing mechanism into either the operative or inoperative position.

4. An attachment for a combine having a straw hood pivotally secured thereto, pulley equipped shafts for driving the separating mechanism of the combine, a single belt operatively connected with the shaft pulleys, and mechanism for varying the tension of the belt to cause the same to assume either an operative or an inoperative position, said attachment including a rock shaft journalled on said combine, a standard on the frame of the combine in close proximity to the operator's position, a journal in said standard for receiving said rock shaft, means adjacent said standard for rocking said shaft, a lever rigidly secured to said rock shaft, a link connected to said lever and adapted for connection with the straw hood for moving the straw hood to operative or inoperative position, a counterbalancing spring connected to said lever for connection with the frame of the combine, and a second link connecting said lever to said belt tensioning varying mechanism whereby the rocking of said rock shaft will simultaneously adjust both the straw hood and the belt of the combine into either operative or inoperative position.

5. In a combine adapted to be pulled by a traction device having a power take-off shaft, a pivoted straw hood, separating mechanism, means adapted to form a releasable driving connection between said separating mechanism and said take-off shaft, mechanism for releasing said driving connection, a lever, a link connection between said lever and the straw hood, a second link connection between said lever and said releasing mechanism, said link connections being arranged so that rocking of said lever causes simultaneous movement of the straw hood to its inoperative position and release of said driving connection, and means adjacent to the position occupied by the operator of the traction device for rocking said lever.

BEREND W. LEFFERDINK.
GLENN G. LEFFERDINK.